Figure 1:
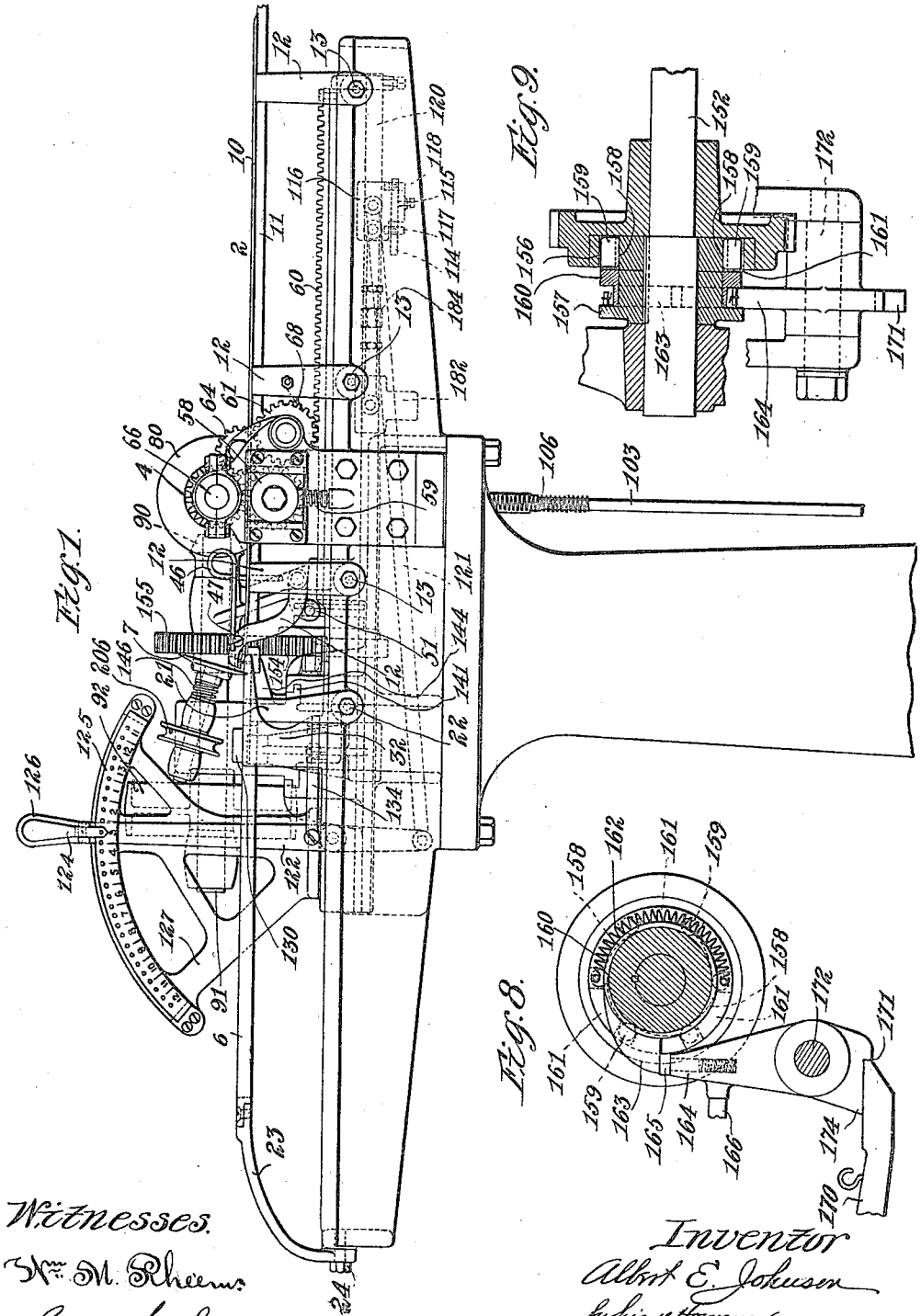

A. E. JOHNSON.
MACHINE FOR PREPARING INSOLES FOR REINFORCING.
APPLICATION FILED APR. 23, 1913.

1,216,130.

Patented Feb. 13, 1917.
6 SHEETS—SHEET 2.

Witnesses.
Wm. M. Rheem
Geo. E. Stibbins.

Inventor
Albert E. Johnson
by his attorneys
Phillips, Van Everen & Fish

A. E. JOHNSON.
MACHINE FOR PREPARING INSOLES FOR REINFORCING.
APPLICATION FILED APR. 23, 1913.

1,216,130.

Patented Feb. 13, 1917.
6 SHEETS—SHEET 3.

Witnesses.
Wm. M. Rheem.
Geo. L. Stebbins

Inventor
Albert E. Johnson
by his attorney
Phillips, VanEverer Fish

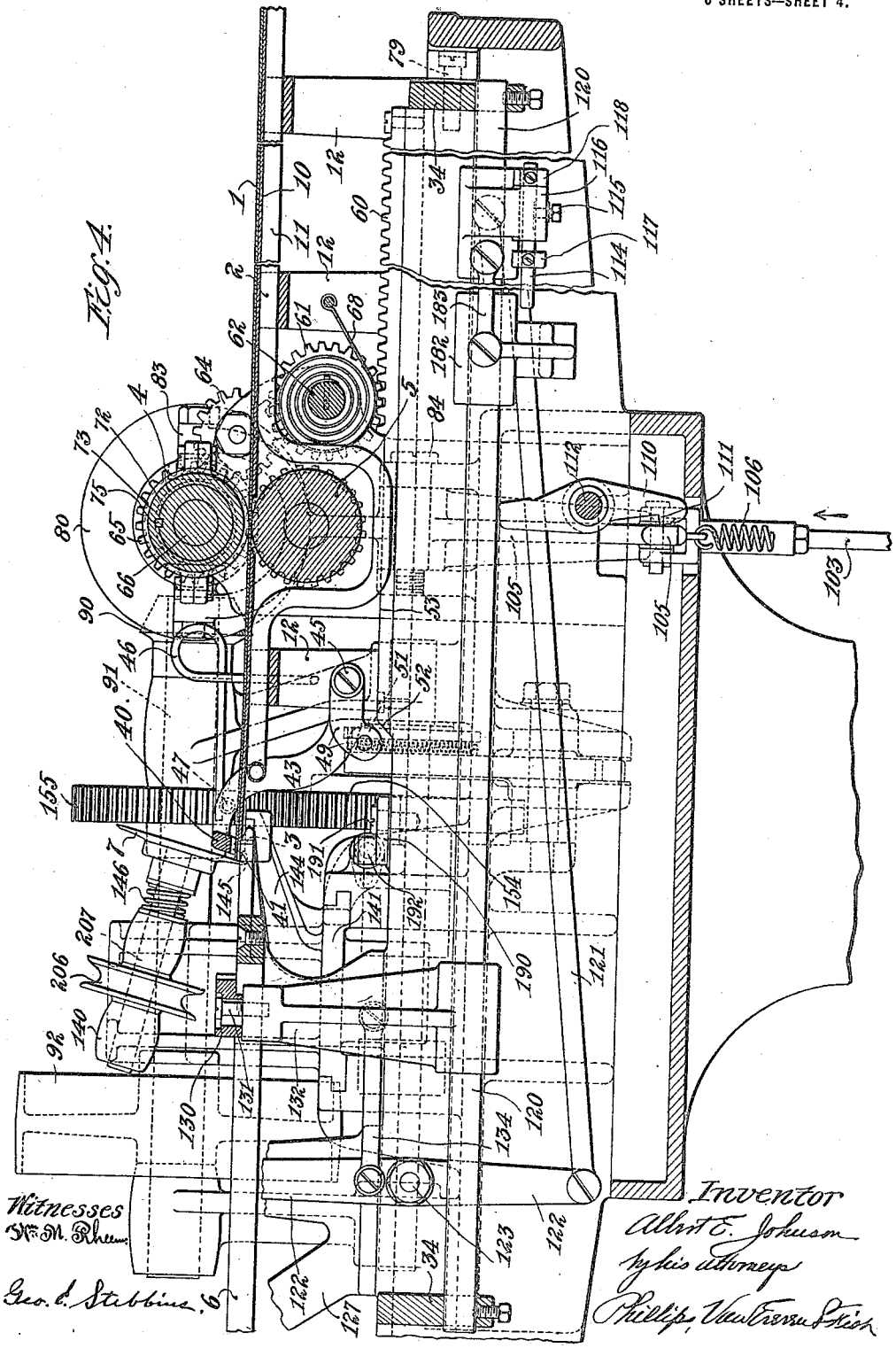

A. E. JOHNSON.
MACHINE FOR PREPARING INSOLES FOR REINFORCING.
APPLICATION FILED APR. 23, 1913.
1,216,130.
Patented Feb. 13, 1917.
6 SHEETS—SHEET 5.
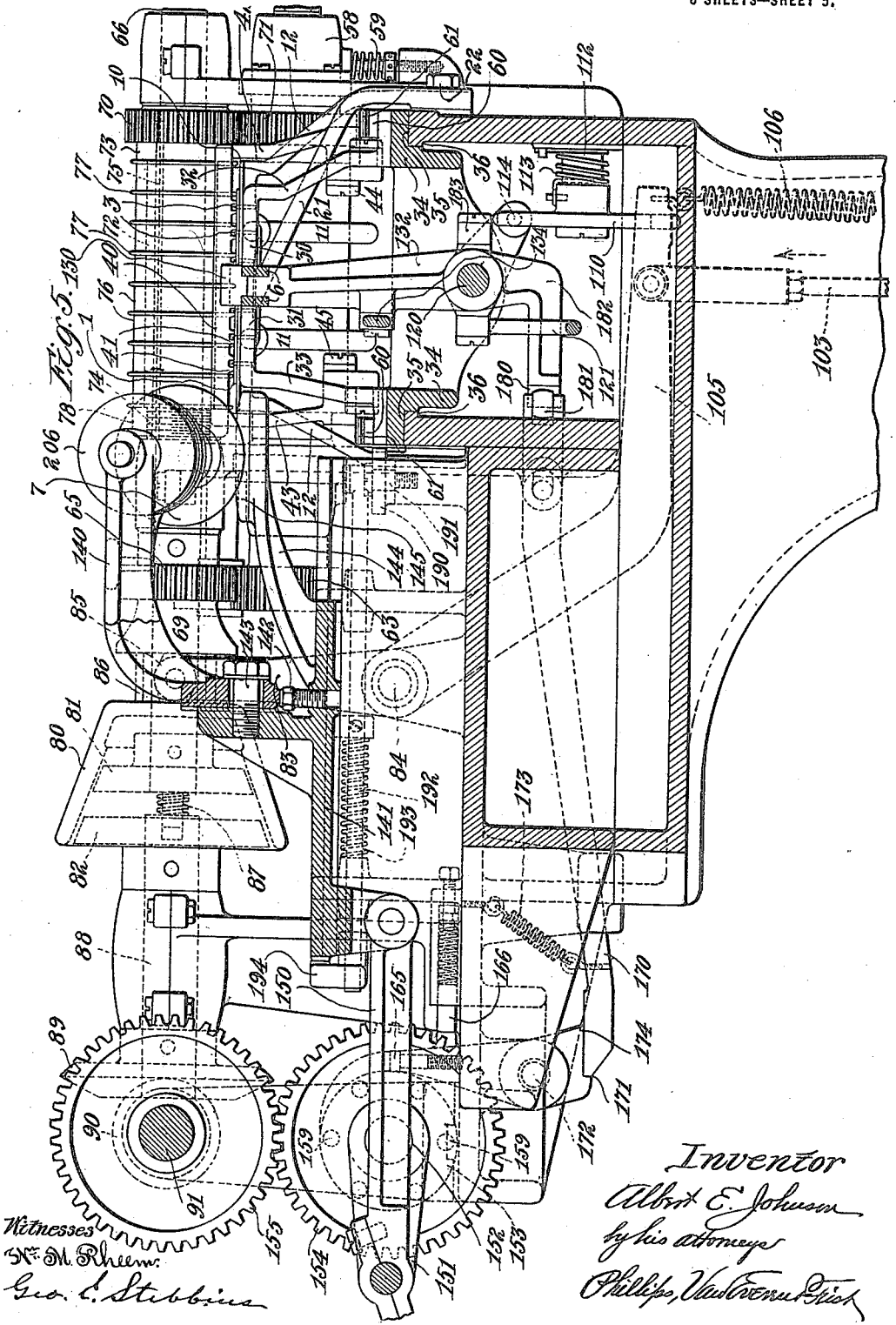

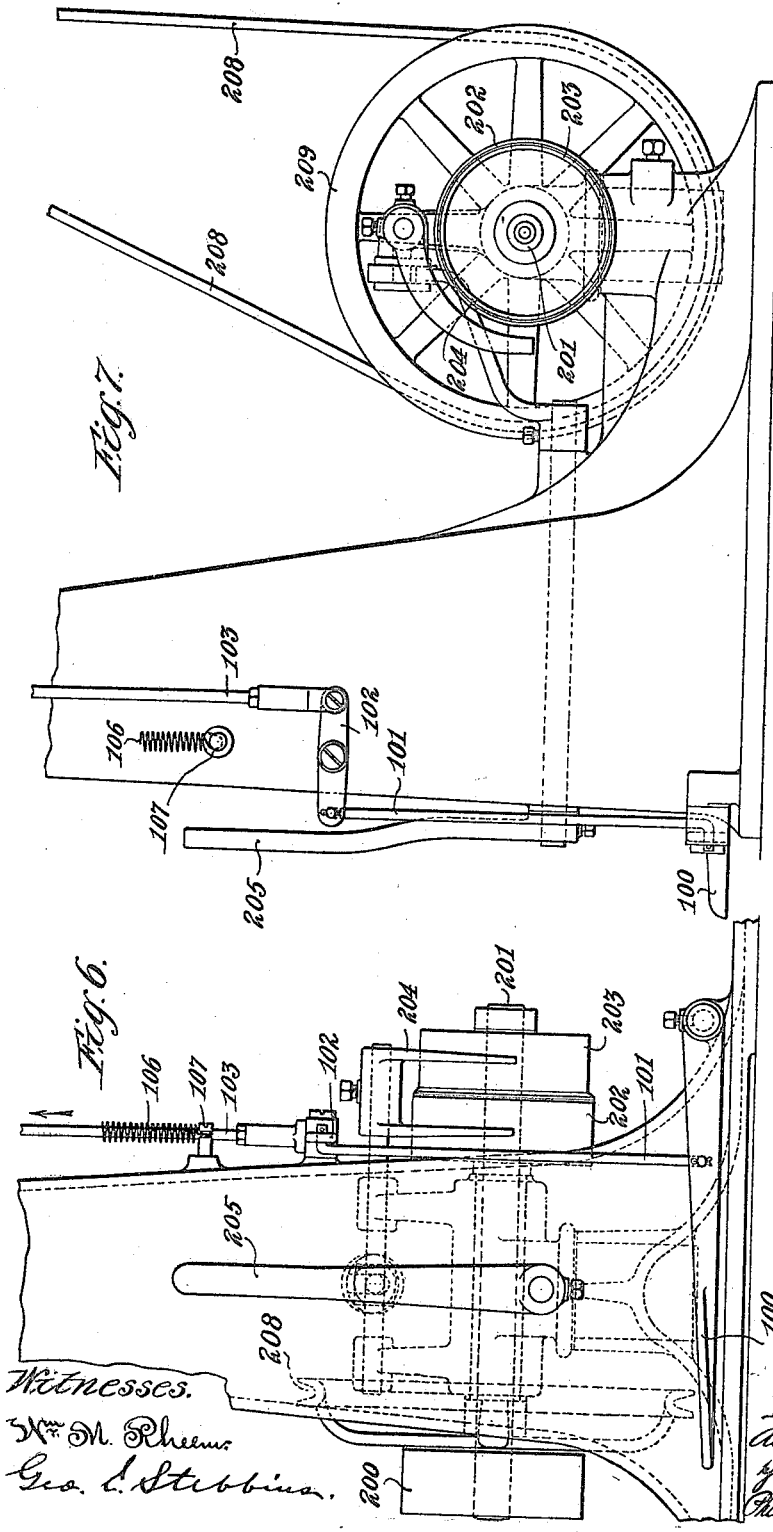

UNITED STATES PATENT OFFICE.

ALBERT E. JOHNSON, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR PREPARING INSOLES FOR REINFORCING.

1,216,130.

Specification of Letters Patent.

Patented Feb. 13, 1917.

Application filed April 23, 1913. Serial No. 763,011.

*To all whom it may concern:*

Be it known that I, ALBERT E. JOHNSON, a citizen of the United States, residing at Beverly, in the county of Essex and State of Massachusetts, have invented certain new and useful Improvements in Machines for Preparing Insoles for Reinforcing; and I do hereby declare the following to be a full, clear, and exact description of the invention, such as will enable others skilled in the art to which it appertains to make and use the same.

The present invention relates to machines for making reinforced insoles, and more particularly to machines for preparing insoles for the operation known as reinforcing.

In making reinforced insoles such as those commonly known to the trade as the "Gem" and "Economy" insoles, a piece of adhesive coated fabric is placed over the flesh side of the insole extending from the toe to a point at the front of the heel portion. After the piece of fabric is properly positioned on the insole, it is pressed against the insole, generally along the middle portion thereof, to stick it to the insole sufficiently so that the piece of fabric will maintain its proper position with relation to the insole during the subsequent reinforcing operation. The insole with the piece of fabric thus stuck in position is ready for the operation commonly known in the art as insole reinforcing, which consists in smoothing the fabric against the insole and snugly tucking it in place around the lip.

The present invention has to do with machines for performing the preliminary operation of positioning and sticking the fabric to the insole in preparation for the subsequent operation of smoothing and tucking the fabric in place commonly known as insole reinforcing. One of the objects of the present invention is to produce a machine in which only the exact amount of fabric which is required is cut off. Other objects of the present invention are to reorganize and improve the construction and mode of operation of this type of machine in certain other respects, the advantages of which will be apparent to those skilled in the art from the following description.

Figure 2:
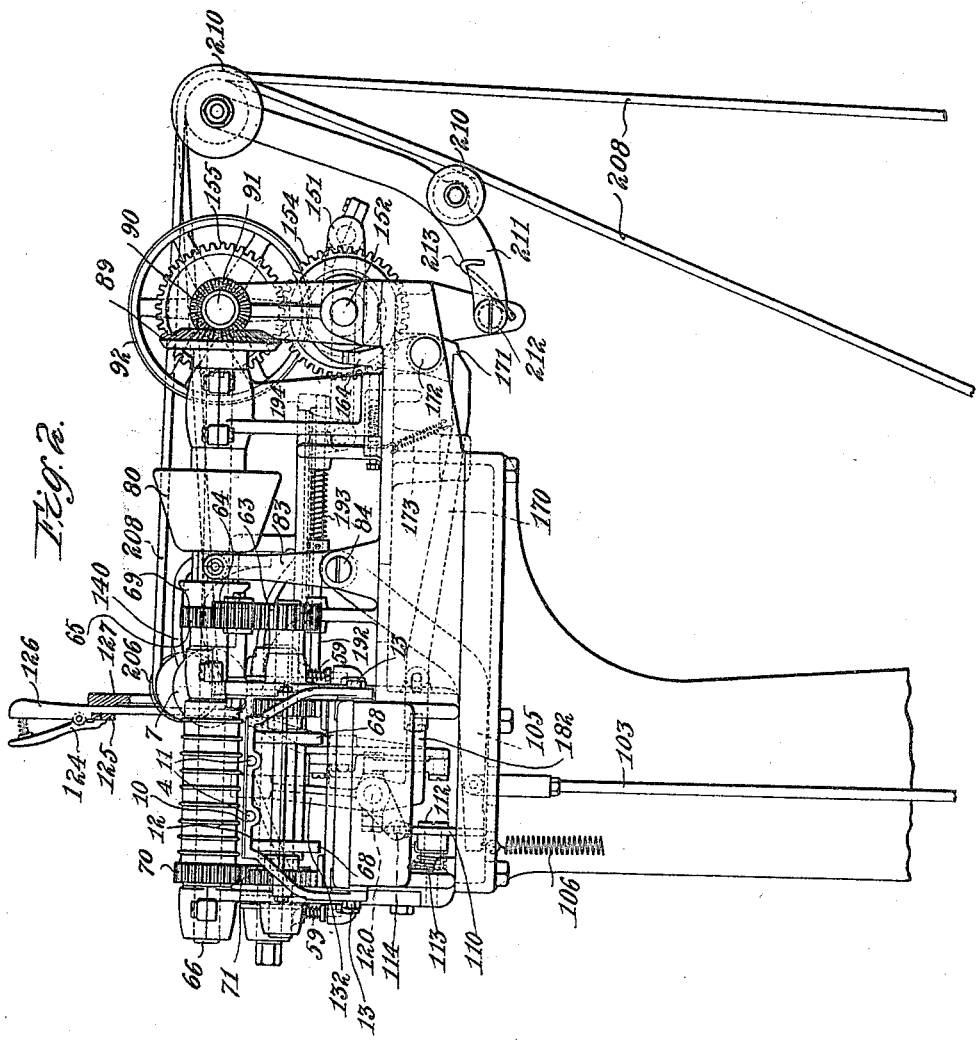
Figure 3:
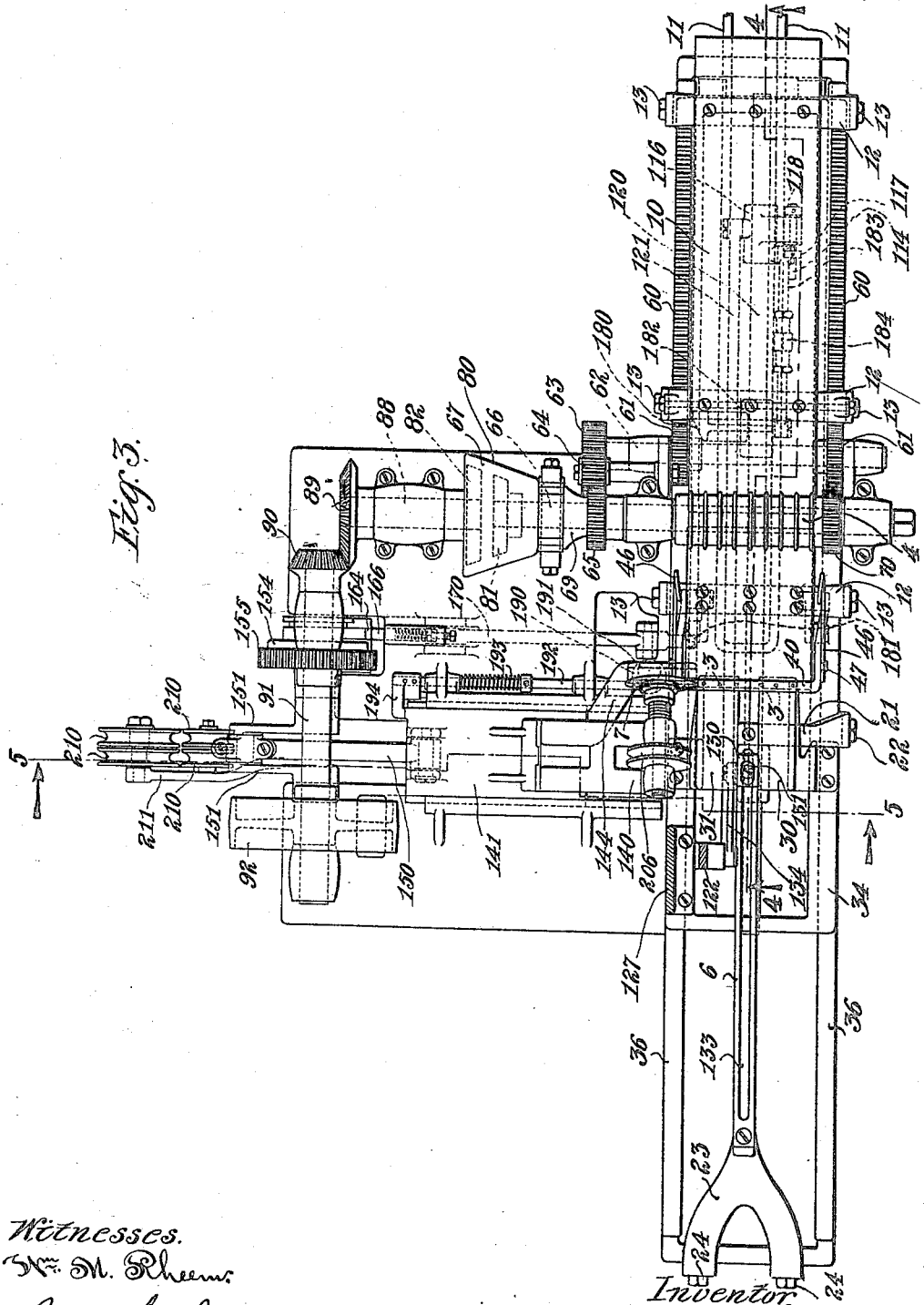

In the drawings, which illustrate the preferred embodiment of the present invention, Figure 1 is a front elevation of the head of the machine; Fig. 2 is a side elevation; Fig. 3 is a plan view; Fig. 4 is a section taken approximately along the line 4—4 of Fig. 3; Fig. 5 is a section taken approximately along the line 5—5 of Fig. 3; Figs. 6 and 7 are front and side elevations respectively of the base of the pedestal; and Figs. 8 and 9 are detailed views of the one-revolution clutch for reciprocating the knife.

The reinforcing canvas which is coated on one side with an adhesive, comes in rolled strips a little wider than the insole. The roll of canvas is mounted on a reel (not shown) at the right of the machine from which the strip of canvas 1 with its coated side upward is drawn over a heater 2 where the adhesive coating of the canvas is softened and rendered tacky by heat. The tacky canvas is transferred or drawn, by means of reciprocating teeth 3, which seize the free end of the canvas, and feed rolls 4 and 5, from the heater 2 to a work table 6 upon which the canvas and insole are stuck together. The drawn out length of fabric is cut off by means of a knife 7 which operates between the heating table and the work table and cuts the fabric close to the toe of the insole, leaving just the required amount of fabric beyond the toe so that no fabric is wasted. The insole to which the canvas is stuck is removed by the operator and another length of canvas is drawn out from the heater to the work table, where the operator again sticks it to an insole. The cutting knife cuts off the canvas and the operation is repeated.

The heater 2 consists of a flat sheet metal table 10 which is kept hot by means of a steam pipe 11. The heating table 10 is supported by three U-shaped bridging members 12 which are secured by means of bolts 13 to the frame of the machine. The adhesive coating on the canvas becomes very tacky under the influence of heat so that after the canvas has traveled over the heater, it is easily stuck to the insole upon the work table 6.

The work table 6 is a slotted narrow metal bar supported at the end nearest the heater by means of a bar 21 bolted at 22 to the front of the machine frame and extending upwardly and rearwardly to the work table. The work table is supported at its other end by means of a curved Y-shaped support 23 secured by bolts 24 to the left hand end of the machine frame. The narrow work table 6 supports the middle of the canvas strip which is drawn onto it and lets the edges of the strip hang down somewhat on each side. As the strip is drawn out onto the work table 6 with the adhesive coated side upward, the operator takes a channeled insole and places it upon the strip, pressing the insole and strip against the work table 6. The work table 6 supports the strip along the middle of the insole and as the operator presses down upon the insole, the insole and strip are stuck together along the middle of the insole inside of the lip. The insole to which the canvas is thus applied, is in condition for the subsequent operation of tucking the canvas into the channel against the lip. The free end of the canvas which projects to the left beyond the end of the heating table 10 is engaged by the sharp teeth 3 which are reciprocated to draw the end of the canvas out over the work table 6. The canvas engaging teeth 3 are mounted upon the forward end of two tables 30 and 31 which are supported upon arms 32 and 33 respectively which extend upward from the sides of a slide 34. The two tables 30 and 31 are level with the top of the work table 6 and are spaced apart, one on each side of the work table 6 so as to travel along the sides of the work table 6 when the canvas is pulled out. The slide 34 is a frame of a substantially rectangular outline having bearing surfaces 35 which slide upon ways 36 on the machine frame. As shown in Fig. 4, the ends of the cloth-engaging teeth 3 are beveled so as to seize and hold the canvas when the teeth are moved to the left, but to release the canvas when they are moved to the right. A presser bar 40 coöperates with the teeth 3 to press the canvas against the teeth until they penetrate it. The presser bar 40 has ribs 41 which engage the canvas at the sides of the teeth 3 to pull down the canvas over the teeth. The presser bar 40 is a substantially horizontal bar extending across the top of the canvas strip and is supported at its ends by downwardly extending curved arms 42 and 43 which are fulcrumed by means of studs 44 and 45 upon legs of one of the work table supports 12. The presser bar 40 is normally held down against the canvas by means of two springs 46 mounted in the tops of the heating table support 12 and having their free ends engaging studs 47 in the arms 42 and 43. The presser bar 40 acts to force the free end of the cloth down upon the teeth 3 when the teeth begin their cloth pulling-out movement. As soon as the teeth pass from beneath the presser bar 40, it is raised out of contact with the canvas. The presser bar supporting arms 42 and 43 have integral with their lower ends laterally extending arms 48 and 49 respectively. The arms 48 and 49 carry at their free ends cam rolls 50 and 51 respectively, which are engaged and lifted by means of risers or cams 52 formed on the top of the slide 34. As the slide 34 is moved to the left and carries with it the teeth 3, the cams 52 lift the presser bar 40 to free the canvas from it. The presser bar 40 is maintained in its raised position by means of a flat elevated surface 53 on the top of the slide 34 which is level with the top of the riser 52 so that, except when the teeth 3 are next the edge of the heating table 10, the presser bar 40 is raised above the canvas.

The slide 34 is reciprocated by means of racks 60 on the top of the slide 34 which are engaged by pinions 61 rigidly mounted on a shaft 62 which is mounted in the machine frame and extends across the top of the slide 34. The end of the shaft 62 bears a gear wheel 63 which is connected through an idler 64 to the gear 65 carried by the sleeve 69 which is loosely mounted to both turn and slide on the shaft 66. The sleeve 69 is intermittently power driven through a clutch 67 to rotate the pinions 61 and move the slide 34 to the left and cause the teeth 3 to carry the end of the canvas over the work table. When the slide 34 is just about to reach its extreme position at the left, the slide is engaged by a lock 190 which, although allowing the slide to complete its movement to the left, prevents it from returning to its initial position at the right. Immediately after the slide 34 is engaged by the lock, the clutch 67 is released to stop the movement of the slide 34. Just before or about simultaneously with the release of the clutch 67, the knife 7 starts to move forwardly across the canvas to cut it. When the knife is retracted to its initial position, the slide 34 is unlocked and is returned to the right to its initial position by means of two spiral or clock springs 68 which are wound around the shaft 62 and turn the pinions 61 backward. The movement of the slide 34 to the right is limited by means of a stop screw 79 threaded in the end of the slide 34 and contacting with the frame of the machine. The screw 79 is adjusted to vary the initial or starting position of the slide 34 and to consequently vary the position of the teeth 3.

The canvas is fed forward over the heating table 10 at the same rate of speed that its free end is drawn out by means of the upper and lower feed rolls 4 and 5. The upper feed roll 4 is driven by the shaft 66 which is intermittently driven through the clutch 67. The lower feed roll 5 is driven from the upper feed roll by means of gears 70 and 71. For convenience in construction, the upper feed roll 4 is built up of a number of parts. The feed roll 4 is built up on a sleeve 72, a short portion 73 of the forward end of which is of the same diameter as the feed roll. The greater part of the sleeve 72 is, however, of less diameter than the part 73 and terminates at the rear in a threaded portion 74. The sleeve 72 is loosely splined upon the shaft 66 by means of a feather 75. The feather 75 also splines the gear 70 to the shaft 66, so that the shaft 66 may have a small sliding movement through the sleeve 72 and gear 70. Fitted over the sleeve 72 are a number of collars 76 and a number of annular plates 77 projecting beyond the collars 76 and forming narrow ribs on the feed roll. The rear collar 78 is screwed on the threaded portion 74 of the sleeve 72 and acts as a nut to clamp the collars 76 and the plates 77 against the enlarged forward end 73 of the sleeve 72. The narrow ribs formed by the plates 77 engage a minimum of the adhesive coated surface of the fabric. The lower feed roll 5 is a roughened or knurled cylindrical roll and projects through a hole cut in the heating table 10 to the level of the top of the heating table. The lower roll 5 is mounted in a vertically movable box 58 which is pressed upwardly by means of springs 59 to yieldingly hold the two feed rolls together.

The clutch 67 comprises a conical female member 80 carried upon the end of the sleeve 69 and two conical male members 81 and 82. The sleeve 69 which is loosely mounted to both slide and rotate on the shaft 62 is reciprocated on the shaft to apply or release the clutch by means of a lever 83 which is fulcrumed at 84 upon the machine frame and the upper end of which is forked and carries rolls 85 which fit in an annular groove 86 in the sleeve 69. The male clutch member 81 is rigidly pinned on the end of the shaft 66. The shaft 66 is spring pressed forwardly by means of a helical spring 87 which extends between the rear end of the shaft 66 and the forward end of the driving shaft 88, and which is so connected between them that the driving shaft 88 can turn freely when the shaft 66 is stationary. The male clutch member 82 is rigidly pinned on the forward end of the driving shaft 88 which, through the bevel gears 89 and 90, is continually driven from a shaft 91 which carries a driving pulley 92. When the lever 83 is turned to slide the sleeve 69 backwardly, the female clutch member 80 first engages the male clutch member 81 and locks the rack driving pinions 61 and the feed rolls 4 and 5 together. The sleeve 69 upon its continued backward movement carries the male clutch member 81 and the sliding shaft 66 with it until the female clutch member 80 engages the constantly driven male clutch member 82 and the pinions 61 and feed rolls 4 and 5 are driven forwardly to pull out the canvas and lay it on the work table 6. When a predetermined length of canvas is pulled out, the lever 83 is automatically turned to draw the sleeve 69 forward and withdraw the female clutch member 80 from both of the male clutch members 81 and 82. The rack driving pinions 61 and the feed rolls 4 and 5 are no longer connected and the rack driving pinions 61 are free to be turned backwardly by the springs 68 without turning the feed rolls backwardly. The reciprocating teeth 3 are thus returned to their initial position while the feed rolls 4 and 5 remain stationary.

The lever 83 is turned to apply the clutch by means of a treadle 100 at the base of the machine which is connected through the treadle rod 101, the lever 102 and the rod 103 to the downwardly and forwardly extending arm 105 of the lever 83. The lever 83 is normally held to release the clutch 67 by means of a helical spring 106 which is connected between the end of the arm 105 of the lever 103 and a stud 107 on the machine pedestal. When the operator desires to draw out the canvas upon the work table, he depresses the treadle 100 which through its connecting rods moves the sleeve 69 backwardly and applies the clutch 67 causing the canvas to be drawn out from the heater to the work table by means of the teeth 3 and the feed rolls 4 and 5. When the lever 83 is turned to apply the clutch, it is engaged by a latch 110 which hooks beneath the arm 105 of the lever 83 and holds it elevated against the force of the spring 106. The latch 110 is a straight lever having a hook 111 on its lower end for engaging beneath the arm 105. The latch 110 is mounted to turn upon a stud 112 on the machine frame and is turned by means of a spring 113 to hold its hook 111 under the arm 105. The clutch is thus maintained applied until the latch 110 is disengaged. The latch 110 is automatically disengaged from the arm 105 of the lever 83 after a predetermined length of canvas has been pulled out by means of a striker 114 which engages the upper end of the latch piece 110 when the slide 34 has traveled a predetermined distance to the left. The striker 114 is a pin adjustably clamped by means of a clamping screw 115 in a block 116. The block 116 is slidingly mounted on a bar 120 which is rigidly mounted in and extends from end to end of the slide 34. The block 116 is adjustably positioned on the bar 120 by means of a link 121 connected between the block 116 and the lower end of a hand lever 122 which is fulcrumed at 123 upon the slide 34. The lever 122 has a handle 126 provided with a pointer and latch 124 which has a pin for engaging the holes in an indicating scale or size gage 125 which is rigidly mounted upon a bracket 127 on the slide 34. On the size gage 125 are marked the sizes and half sizes of the insoles to which the canvas is to be applied in this machine. The handle 126 is positioned by the operator to determine the amount of canvas drawn out. When the handle 126 is positioned at the left hand end of the size gage, the striker 114 is moved to the right and a greater length of canvas is drawn out than is the case when the handle 126 is positioned at the right hand end of the size gage. The scale on the size gage 125 is so taken that the correct amount of canvas is drawn out for the insole size at which the handle 126 is positioned on the size gage.

The reinforcing canvas is not laid over the heel part of the insole, but extends from the toe over the fore part and shank to a point at the front of the heel part where the lip to which the upper is sewed ends. The distance from the edge of the canvas to the back of the heel, taken in proportion to the length of the insole, is a constant ratio in the same shape of insole regardless of its size. The actual distance, however, between the edge of the canvas and the back of the heel varies with the size of the insole. In order to properly position the edge of the canvas the correct distance from the back of the heel, an adjustable heel gage 130 is provided against which the operator places the heel of the insole. In applying the canvas to the insole, the operator lays the insole flesh side down upon the canvas, positioning the heel of the insole against the heel gage 130. As will readily be seen upon reference to the drawings, the heel gage is spaced from the teeth 3, so that the free edge of the canvas which is engaged by the teeth 3 will be spaced from the back of the heel of the insole. The heel gage 130 has a slot through which is received the screw 131 which adjustably holds the heel gage upon the top of the post 132 which extends into the long slot 133 in the work table 6. The post 132 is slidingly mounted on the rod 120. In order to adjust the heel gage 130 to and from the teeth 3 and to consequently correctly position the edge of the canvas with relation to the end of the insole heel in insoles of different sizes, the post 132 is adjusted in position by means of a link 134 connected with the lever 122. When the handle 126 of the lever 122 is positioned at the left hand end of the size gage 125, the heel gage 130 is moved away from the teeth 3 so that the edge of the canvas is spaced a greater distance from the end of the insole heel than is the case when the handle 126 is positioned at the right hand end of the size gage 125. Since the striker 114, which determines the length of the canvas drawn out, and a heel gage, which spaces the edge of the canvas from the insole heel, are both connected to the same lever 122 and are, therefore, coördinately varied in position by the movement of the handle 126, all that is required of the operator in changing from one size to another size insole is to position the handle 126 at the required number on the size gage and the machine will draw out the required length of canvas and position it properly with relation to the insole. The heel gage 130 moves with the slide 34 so that the insole may be positioned on the fabric while the fabric is being pulled off. Some manufacturers prefer to space the edge of the canvas farther forward from the back of the heel than do others, and, in order to afford an adjustment for spacing the edge of the canvas nearer or farther from the end of the heel irrespective of the size of the insole, the screw 131 may be loosened and the heel gage 130 adjusted with relation to its supporting post 132. The ratio of the distance between the edge of the canvas and the back of the heel to the length of the insole is varied by adjusting the heel gage 130 on its post 132. This ratio is kept approximately constant thereafter, when the heel gage is varied in position by means of the size gage handle 126 for insoles of different sizes. The striker pin 114 should be positioned so that when the slide 34 is arrested after the canvas is drawn out that the knife 7 cuts the canvas close to the toe of the insole, leaving just sufficient canvas to be tucked into place at the toe without leaving waste canvas to be afterward trimmed off. Some manufacturers prefer to cut their canvas a little closer to the toe than other manufacturers, and in different types of insoles it is necessary to cut the canvas closer to or farther from the end of the toe, as, for example, in making a "Gem" insole, it is necessary to leave a little more canvas beyond the toe than in making an "Economy" insole. The length of the insoles themselves varies somewhat depending upon the style of the toe, for example, a pointed toe insole is longer than a medium toe insole of the same size. In order to vary the amount of canvas drawn out so that the knife 7 cuts it at the correct distance from the toe, and in order to vary the amount of canvas drawn out as required by different styles of toes, the striker pin 114 may be adjusted by loosening the clamping screw 115 and shifting the striker pin in its block 116. To cut the canvas closer to the toe, the striker pin 114 is to be shifted to the left to cause the slide 34 to be arrested sooner. In changing from a medium to a pointed toe and vice versa, the striker pin 114 is adjusted to allow the slide 34 to draw more or less canvas according to the extra length required by the toe. In order to provide a convenient and rapid adjustment for medium or pointed toe insoles, positioning collars 117 and 118 are adjustably mounted on the striker pin 114. When the striker pin 114 is positioned, as shown in Fig. 4, of the drawings, with the collar 118 against the block 116, the striker pin 114 is set for a medium or blunt toe. To change to a pointed toe, the operator loosens the clamping screw 115, moves the striker pin 114 until it is stopped by the collar 117, and again tightens the clamping screw 115. The striker pin 114 is thus spaced to allow the necessary extra canvas required by the pointed toe to be drawn out. After the striker pin 114 is adjusted in its supporting block 116 to properly adjust the amount of canvas drawn out according to the type and style of the insole, the position of the block 116 and the striker pin 114 is varied for different sizes of the same type and style of insole by means of the size gage handle 126.

After the correct amount of canvas has been pulled out, it is cut off close to the end of the insole toe by means of the rotary knife 7 which is automatically moved across the canvas near the end of the heating table 10. The rotary knife 7 is mounted in a bracket 140 on a slide 141 slidingly mounted in the machine frame. The bracket 140 is vertically adjusted with respect to the slide 141 by means of an adjusting screw 142 and is rigidly clamped in adjusted position by means of a screw 143 received in a slot in the bracket 140. A second bracket 144 also projects from the slide 141 and has formed upon its end a sharp edge 145 against which the rotary knife 7 cuts the canvas. The rotary knife 7 is yieldingly held against the sharp edge 145 by means of a spring 146. The slide 141 is reciprocated to carry the rotary knife 7 across the canvas by means of a pitman 150 connected to a crank 151 on a countershaft 152. The countershaft 152 is intermittently driven through a one-revolution clutch 153 by a continuously driven gear wheel 154 loosely mounted on the countershaft 152 and driven from a gear wheel 155 carried by the constantly rotating shaft 91. The clutch 153 is of the Horton roller type and operates to carry the cutting knife 7 across the canvas and then automatically releases itself. The constantly rotating gear wheel 154 mounted on the shaft 152 has an annular internal smooth clutch surface 156. Projecting within the gear wheel 154 is a sleeve 157 rigidly mounted on the shaft 152. The sleeve 157 has a plurality of cam surfaces 158 which are shaped so that the rotation of the gear wheel 154 will tend to carry the clutch rollers 159 onto the high parts of the cams and so to lock the gear wheel 154 to the sleeve 157 on the shaft 152. Surrounding the sleeve 157 is a roll-holding cage 160 which has fingers 161 between which are held the rollers 159. The cage 160 is connected by means of a spring 162 to the sleeve 157. The spring 162 tends to relatively turn the cage 160 and sleeve 157 to carry the rollers onto the higher parts of the cams where they are wedged into place by the movement of the driven gear wheel 154. The cage 160 has a lug 163 which is arranged to be held by a stop 164 which prevents the rotation of the cage. When the cage 160 is held from rotation, the rollers 159 cannot ride up on the high parts of the cams 158, and the clutch is held in inoperative position. The Horton clutch above described is old and well-known and forms no part of the present invention. The impact of the projection 163 against the stop 164 is cushioned by a bunter 165 spring mounted in the end of the stop 164. The stop 164 is normally held in the path of the projection 163 to hold the clutch by means of a spring pressed plunger 166 which bears against the side of the stop 164. The stop 164 is moved from under the clutch projection 163 by means of a rod 170, the end of which engages a shoulder 171 at the lower end of the stop 164 to turn it about its supporting stud 172. The rod 170 is drawn upwardly and forwardly by means of a spring 173 to hold the end of the rod in engagement with the shoulder 171. When the rod 170 is moved backwardly, it turns the latch from under the projection 163. The continued backward movement of the rod 170 still further turns the stop piece 164 until the toe 174 at the bottom of the stop piece pushes the end of the rod out of engagement with the shoulder 171, whereupon the spring pressed plunger 166 returns the stop 164 to its horizontal position to release the clutch after a single revolution. The rod 170 is thrust backward to apply the clutch by means of a cam 180 which bears against a roller 181 in the front end of the rod 170. The cam 180 is formed on the end of an arm projecting backwardly from a block 182 which is slidingly mounted upon the bar 120. The block 182 is connected through a rod 183 to the block 116 so that its position is determined by the position of the block 116 which in turn is controlled by the lever 122 and handle 126. The rod 183 has an adjusting sleeve 184 to adjust the relative positions of the block 182 and 116. When the slide 34 has just about reached the limit of its movement to the left, the cam 181 moves the rod 170 sufficiently to allow the clutch 153 to lock the gear 154 to the countershaft 152 and start the countershaft upon its single revolution which carries the knife 7 across the canvas to cut it.

The striker 114 causes the clutch 67 to be released approximately simultaneously with the application of the clutch 153, and in order to prevent the slide 34 from returning to its initial position at the right of the machine until after the knife 7 has cut off the canvas, a lock is provided for locking the slide 34 in position until after the knife 7 has been retracted. The lock comprises an eccentric 190 mounted upon a stud 191 on the machine frame in position to engage the rear of the slide 34. A rod 192 is connected to the eccentric 190 and is spring-held by a spring 193 to turn the eccentric against the slide 34. The eccentric 190 allows the slide 34 to freely complete its movement to the left, but prevents it from returning to the right, because any movement of the slide to the right tends to turn the eccentric and wedge it firmly against the table. The end of the rod 192 carries a block 194 which projects back of the cutting knife carrying slide 141. When the slide 141 is in its normal position with the knife at one side of the canvas, the block 194 is engaged by the slide 141 and the eccentric 190 is held out of engagement with the slide 34. When the slide 141 starts forward to carry the cutting knife 7 across the canvas, the block 194 is released and the spring 193 holds the eccentric 190 against the slide 34 and locks it against movement to the right. The parts of the machine are so timed that when the slide 34 has reached the end of its movement to the left and before the clutch 67 is released to allow the slide 34 to be moved to the right, the eccentric lock 190 grips the slide 34 and prevents its return to the right until after the canvas cutting operation is completed. After the canvas has been cut and the slide 141 returns to its retracted position, the slide 141 reëngages the block 194, draws back the eccentric 190 and releases the slide 34.

The pulley 92 which drives the pulling out mechanism and the knife reciprocating mechanism is driven by a belt running to a pulley 200 mounted on a countershaft 201 at the base of the machine pedestal. The countershaft 201 carries fast and loose pulleys 202 and 203 respectively upon which the belt which furnishes power for the machine is guided by a belt shipper 204 which is shifted to throw the power on and off by means of a foot operated shipper lever 205. The rotary cutting knife 7 is driven by a pulley 206 carried by the knife spindle 207 by means of a belt 208 running to a driving pulley 209 mounted upon the countershaft 201 at the base of the machine pedestal. The belt 208 is guided over idle pulleys 210 which are carried upon an arm 211 pivoted at 212 to the machine frame to allow the guiding pulleys to move with the belt to permit the pulley 206 to move forward with the knife carrying slide 141. A spring 213 yieldingly presses against the arm 211 to maintain a light tension on the belt 208.

The operation of the machine is briefly as follows:—

The end of the canvas is brought over the heater 2, between the feed rolls 4 and 5, to the edge of the heater and over the teeth 3. The operator positions the handle 126 to the number on the size gage corresponding to the size of insole to which the canvas is to be applied. The operator depresses the treadle 100 to cause the teeth 3 and feed rolls 4 and 5 to pull out the canvas from the heater onto the work table 6. After the operator has depressed the treadle, he immediately removes his foot from it, and as the canvas is drawn out onto the work table 6 he lays an insole with the flesh side down upon the tacky canvas strip, positioning the heel of the insole against the heel gage 130. As the canvas is pulled out, the operator applies and presses the insole against the canvas. When the proper length of canvas has been pulled out, the cam 180 operates through the rod 170 to apply the one-revolution clutch 153 and the striker pin 114 operates through the latch 110 to release the clutch 67 and stops the movement of the teeth 3 and feed rolls 4 and 5. Thereupon, the rotary cutting knife travels across the canvas to cut it. During the cutting operation, the slide 34 is held locked by the eccentric lock 190. After the knife 7 has been retracted, the slide 34 is released and is drawn back into starting position by the springs 68. The knife 7 has cut the canvas close to the toe of the insole and the operator after finishing pressing the insole and canvas together on the work table, removes the insole with the canvas applied to it, and again depresses the treadle 100 to transfer a fresh piece of canvas from the heater to the work table and repeats the operation.

While the preferred embodiment of the present invention has been specifically illustrated and described, it is to be understood that the present invention is not limited to its preferred embodiment, but may be embodied in other constructions within the scope of the invention as set forth in the following claims:—

1. A machine for preparing insoles for reinforcing having, in combination, a work table upon which the reinforcing fabric and insole are stuck together, means engaging the portion of the fabric to be cut off for pulling the fabric and delivering it to the work table, and a knife for cutting off the pulled out length of fabric.

2. A machine for preparing insoles for reinforcing having, in combination, a work table upon which the reinforcing fabric and insole are stuck together, means engaging the portion of the fabric to be cut off for pulling out the fabric and delivering it to the work table including mechanism acting automatically to stop the movement of the fabric after a predetermined length has been pulled out, and a knife for cutting off the pulled out length of fabric.

3. A machine for preparing insoles for reinforcing having, in combination, a work table upon which the reinforcing fabric and insole are stuck together, means for pulling out a predetermined length of fabric and delivering it to the work table, means for varying the length of fabric pulled out, and a knife for cutting off the pulled out length of fabric.

4. A machine for preparing insoles for reinforcing having, in combination, a work table upon which the reinforcing fabric and insole are stuck together, means for determining the position of an insole upon the table, means for pulling out the fabric and delivering it to the work table in a definite relation to the positioning means, a knife for cutting off the pulled out length of fabric, and means acting automatically to cause the knife to cut off the fabric after a predetermined length has been pulled out.

5. A machine for preparing insoles for reinforcing having, in combination, a work table upon which the reinforcing fabric and insole are stuck together, means for determining the position of an insole upon the table, and means for pulling out a predetermined length of a fabric and delivering it to the work table including mechanism for seizing the free end of the fabric and pulling it over the work table.

6. A machine for preparing insoles for reinforcing having, in combination, a work table upon which the reinforcing fabric and insole are stuck together, and means for pulling out a predetermined length of fabric and delivering it to the work table including reciprocating mechanism for seizing the free end of the fabric and carrying it over the work table, and a feed roll for feeding the fabric at the same speed as the reciprocating mechanism.

7. A machine for preparing insoles for reinforcing having, in combination, a work table upon which the reinforcing fabric and insole are stuck together, means for pulling out a predetermined length of fabric and delivering it to the work table including mechanism for seizing the free end of the fabric and carrying it over the work table, a feed roll for feeding the fabric at the same speed as the mechanism for seizing the free end, and a knife for cutting the fabric between said mechanism and the feed roll.

8. A machine for preparing insoles for reinforcing having, in combination, a work table upon which the reinforcing fabric and insole are stuck together, means for pulling out a predetermined length of fabric and delivering it to the work table including reciprocating mechanism for seizing the free end of the fabric and carrying it over the work table, a feed roll for feeding the fabric at the same speed as said reciprocating mechanism, and means for retracting the reciprocating mechanism while the feed roll is stationary.

9. A machine for preparing insoles for reinforcing having, in combination, a work table upon which the reinforcing fabric and insole are stuck together, means for pulling out a predetermined length of fabric and delivering it to the work table including a feed roll and mechanism for seizing the free end of the fabric and carrying it over the table, a clutch for connecting the reciprocating mechanism and feed roll to cause them both to feed the fabric at the same speed and acting to disconnect the reciprocating mechanism and feed roll after the fabric has been pulled out, and means for retracting the reciprocating mechanism.

10. A machine for preparing insoles for reinforcing having, in combination, a work table upon which the reinforcing fabric and insole are stuck together, means for pulling out a predetermined length of fabric and delivering it to the work table including a feed roll and reciprocating mechanism for seizing the free end of the fabric and carrying it over the work table, a clutch for connecting the reciprocating mechanism and the feed roll and thereafter applying power to cause them both to feed the fabric at the same speed, and means acting automatically to cause the clutch to disconnect the power and thereafter to disconnect the reciprocating mechanism and feed roll from each other.

11. A machine for preparing insoles for reinforcing having, in combination, a work table upon which the reinforcing fabric and insole are stuck together, means for pulling out a predetermined length of fabric and delivering it to the work table including reciprocating mechanism for seizing the free end of the fabric and carrying it over the work table and the feed roll, a clutch comprising a driving member and two driven members one connected to the reciprocating mechanism and the other connected to the feed roll, and means for first relatively reciprocating the two driven members to bring them into clutching engagement and thereafter connecting them to the driving member.

12. A machine for preparing insoles for reinforcing having, in combination, a work table upon which the reinforcing fabric and insole are stuck together, means for pulling out a predetermined length of fabric and delivering it to the work table including a reciprocating slide, a knife for cutting off the pulled out length of fabric, means for holding the slide stationary while the knife is cutting the fabric, and means acting automatically to retract the slide after the fabric is cut off.

13. A machine for preparing insoles for reinforcing having, in combination, means for supporting a roll of reinforcing fabric having an adhesive coating on one face, a work table for receiving strips of reinforcing fabric to be stuck to the insoles, a knife for cutting off strips of fabric, and means for pulling off fabric from the roll and delivering it to the table, comprising a reciprocating feeding member arranged to contact one side only of the fabric, and mechanism for attaching the fabric to the feeding member.

14. A machine for preparing insoles for reinforcing having, in combination, a work table upon which a prepared reinforcing fabric and insole are stuck together, a heating table over which the fabric is passed with the uncoated side of the fabric in contact with the table surface for rendering tacky the adhesive coating of the fabric, and means for transferring the fabric in a tacky condition from the heating table to the work table including a pair of rolls arranged to clamp the fabric between them, one of the rolls being ribbed for engaging the coated surface of the fabric.

15. A machine for preparing insoles for reinforcing having, in combination, a work table upon which the fabric and insole are stuck together, a heating table over which the fabric is passed for rendering tacky the adhesive coating of the fabric, and means for transferring the fabric in a tacky condition from the heating table to the work table including mechanism for seizing the end of the fabric nearest the work table and carrying it over the work table.

16. A machine for preparing insoles for reinforcing having, in combination, a work table upon which the reinforcing fabric and insole are stuck together, means for pulling out the fabric and delivering it to the work table, a rotary knife, a slide mounted to reciprocate at right angles to the movement of the fabric, and means acting automatically after a predetermined length of fabric has been drawn out to reciprocate the slide and carry the knife across the fabric to cut off the pulled out length of fabric.

17. A machine for preparing insoles for reinforcing having, in combination, a work table upon which the reinforcing fabric and insole are stuck together, means for pulling out the fabric and delivering it to the work table, including mechanism for engaging the free end of the fabric and carrying it across the work table, means for cutting off the pulled out length of fabric, and a gage for relatively positioning the edge of the fabric and the heel of the insole.

18. A machine for preparing insoles for reinforcing having, in combination, a work table upon which the reinforcing fabric and insole are stuck together, means for pulling out the fabric and delivering it to the work table, and a movable heel gage carried across the work table at the same speed as the fabric for relatively positioning the edge of the fabric and the heel of the insole.

19. A machine for preparing insoles for reinforcing having, in combination, a work table upon which the reinforcing fabric and insole are stuck together, means for pulling out a length of fabric and delivering it to the work table, a gage for relatively positioning the edge of the fabric and the heel of the insole, and means connected with the pulling out mechanism and the gage for coördinately varying the length of fabric pulled out and the distance from the edge of the fabric to the end of the heel.

20. A machine for preparing insoles for reinforcing having, in combination, a stationary work table upon which the reinforcing fabric and insole are stuck together, means for pulling out the fabric and delivering it to the work table including a reciprocating slide, and a heel gage connected with the slide to move across the work table.

21. A machine for preparing insoles for reinforcing having, in combination, a work table upon which the reinforcing fabric and insole are stuck together, means for pulling out and delivering the fabric to the work table, a gage for spacing the edge of the fabric a predetermined distance from the end of the insole heel, and means for coordinately varying the position of the gage and the length of fabric pulled out so as to cause the edge of the fabric to have the same relative position on different size insoles.

22. A machine for preparing insoles for reinforcing having, in combination, a work table upon which the reinforcing fabric and insole are stuck together, means for pulling out and cutting off the predetermined amount of fabric required for the insole including mechanism for engaging the free end of the fabric and carrying it over the work table, and a size gage for varying said amount of fabric.

23. A machine for preparing insoles for reinforcing having, in combination, a work table upon which the reinforcing fabric and insole are stuck together, means for pulling out and cutting off the predetermined amount of fabric required for the insole, a gage for relatively positioning the insole and fabric, and a size gage for varying both the said amount of fabric and the position of the first gage.

24. A machine for preparing insoles for reinforcing having, in combination, a work table upon which the reinforcing fabric and insole are stuck together, means for pulling out and cutting off the predetermined amount of fabric required for the insole, a size gage for varying said amount of fabric, and an adjustment independent of the size gage for varying said amount of fabric.

25. A machine for preparing insoles for reinforcing having, in combination, a work table upon which the reinforcing fabric and insole are stuck together, means for pulling out and cutting off the predetermined amount of fabric required for the insole, a heel gage for relatively positioning the fabric and insole, and a size gage for varying the position of the heel gage.

26. A machine for preparing insoles for reinforcing having, in combination, a work table upon which the reinforcing fabric and insole are stuck together, means for pulling out and cutting off the predetermined amount of fabric required for the insole, a heel gage for relatively positioning the fabric and insole, a size gage for varying the position of the heel gage, and an adjustment independent of the size gage for independently varying the position of the heel gage.

27. A machine for preparing insoles for reinforcing having, in combination, means for supporting a roll of reinforcing fabric having an adhesive coating on one face, a work table for receiving strips of reinforcing fabric to be stuck to the insoles, a knife for cutting off strips of fabric, and means for pulling off fabric from the roll and delivering it to the table, comprising a reciprocating feeding member having a series of feeding teeth to engage the non-coated face of the fabric, and means to attach the fabric to the teeth.

ALBERT E. JOHNSON.

Witnesses:
MERTON E. JOHNSON,
GEO. E. STEBBINS.

Copies of this patent may be obtained for five cents each, by addressing the "Commissioner of Patents, Washington, D. C."